Patented July 4, 1933

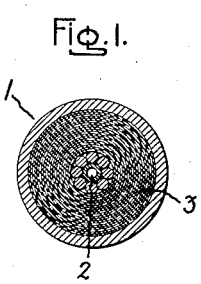
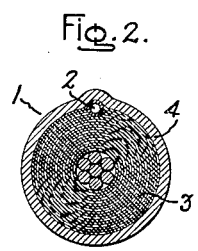
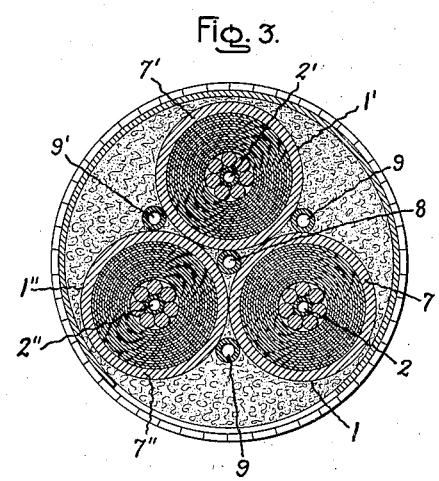
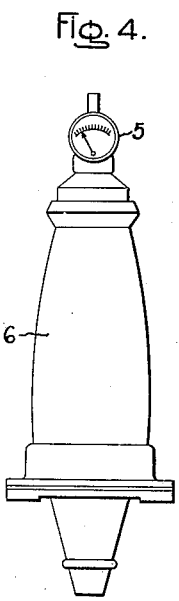
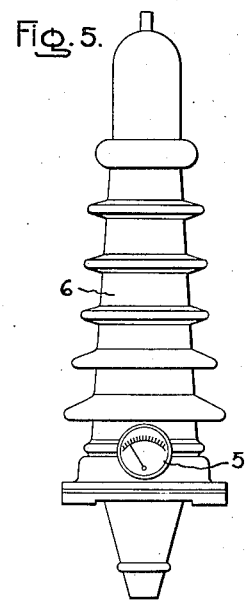

1,917,129

UNITED STATES PATENT OFFICE

ERNST KIRCH, OF BERLIN-OBERSCHONEWEIDE, GERMANY, ASSIGNOR TO GENERAL ELECTRIC COMPANY, A CORPORATION OF NEW YORK

TEMPERATURE INDICATOR

Application filed December 21, 1931, Serial No. 582,456, and in Germany December 24, 1930.

My invention relates to temperature indicators and concerns particularly devices for indicating the temperature of electrical apparatus and for regulating such apparatus in response to its temperature. The principal object of my invention is the provision of simple, inexpensive and thoroughly reliable means directly responsive to temperature.

In accordance with my invention, I provide electrical cables or other electrical apparatus the temperature of which is to be indicated with hollow wires or tubes closed at one end and lying along the conductors, embedded in the insulation or placed in any other portion of the apparatus in which indications of temperature are desired. The tubes are filled with a suitable liquid or gaseous substance, preferably one which varies appreciably in pressure as the volume is kept constant and the temperature changes. A suitable pressure-responsive device is connected to the open end of each tube containing the temperature-sensitive substance and may be directly calibrated in terms of temperature.

The features of my invention, which I believe to be novel and patentable will be pointed out in the claims appended hereto. My invention itself, however, will be best understood by referring to the following specification taken in connection with the accompanying drawing in which Figs. 1 and 2 illustrate in cross section single conductor cables provided with tubes containing a temperature-sensitive substance in accordance with my invention; Fig. 3 represents a multiple conductor cable employing temperature-responsive tubes in accordance with my invention; and Figs. 4 and 5 represent pot heads or terminals which may be used in connection with the apparatus shown in Figs. 1 to 3.

Referring to the drawing Fig. 1 represents an electrical cable comprising a stranded conductor having a core which consists of a tube 2 containing a temperature-sensitive substance and composed of any suitable material such as copper, lead, aluminum, or other metals or their alloys. The temperature-sensitive substance may, if desired, normally be at a pressure above atmospheric. In Fig. 2 a similar tube 2 is placed between a mass of insulation 3 and a lead sheath 4 in order to provide an indication of the temperature rise in the insulation. If desired the tube 2 may also be utilized as an auxiliary or a neutral conductor. In this manner I avoid using additional material or increasing the size of the cable.

Preferably one end of the tube 2 is closed and the other end is connected to a suitable pressure-responsive device. In employing the arrangement shown in Fig. 1 or a similar arrangement in which the tube 2 lies in close proximity with a line conductor, it is desirable to bring the tube 2 to the pressure-responsive device through an insulating terminal. The cable is provided with a suitable pot head or insulated terminal in the customary manner.

One form of cable terminal is shown in Fig. 4 in which the tube 2 is connected to a pressure-responsive device 5, mounted at the upper end of the insulator 6. The device 5 is thus at the same electrical potential as the conductor.

In the arrangement shown in Fig. 5, an insulating tube extending into the base of the insulator 6 is provided to connect the tube 2 in the core of the insulator to the pressure-responsive device 5 without subjecting the latter to the potential of the conductor. The device 5 which does not constitute part of my invention, may take the form of either an indicating or a regulating device and may also be arranged to actuate a telemeter or recording apparatus.

My device permits obtaining an indication responsive to the average temperature along the full length of a conductor of an electric cable, electric transformer, or other device, as well as along relatively inaccessible parts of other apparatus of considerable length. Likewise in connection with oil filled cables my device has the advantage of permitting, in response to the rate of change of temperature, automatic regulation of apparatus controlling the pressure in oil expansion vessels, thereby avoiding excessive mechanical stresses in the insulation or in other parts as a result of sudden expansion of oil due to temperature rises.

In applying my invention to three-phase cables it is necessary to equip only one of the conductors with a tube for measuring the heating due to symmetrical loads. However, if it is desired to include heating due to short circuits, it is desirable to equip all the phases with tubes for temperature measurement since short circuits do not as a rule affect all the phases at the same time. In connection with multi-conductor cables, I prefer to place tubes for temperature-sensitive substance both within the conductors and in the insulation. For example, in the arrangement shown in Fig. 3, the three-conductor cable comprises the conductors, 1, 1′ and 1″, with independent lead sheaths 7, 7′ and 7″. Tubes 2, 2′ and 2″ are provided in conductors 1, 1′ and 1″; tube 8 is embedded in the inner insulation between conductors and tubes 9, 9′ and 9″ in the outer insulation. The tubes are similar to those employed in the single-conductor cables shown in Figs. 1 and 2, and they may be arranged in combination with suitable pressure-responsive devices to provide independent supervision of the various parts of the cable, indications of differences between temperatures in various parts of the cable, or in any other manner as desired.

While I have described my invention as embodied in concrete form and as operating in a specific manner in accordance with provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is:

1. In combination with a multistrand electrical cable, a tube forming a core for said cable, a substance within said tube varying in pressure with variations in temperature, and a pressure-responsive device responsive to variations in pressure of said substance.

2. In combination with an electrical cable comprising a plurality of wires forming a stranded conductor, one of said wires being hollow, a substance contained in said hollow wire which varies in pressure with variations in temperature, and pressure-responsive means connected to said hollow wire to provide a response dependent upon the temperature of said stranded conductor.

3. In combination with an insulated electrical cable, a hollow wire embedded in a portion of said cable, a substance varying in pressure with variations in temperature and contained in said hollow wire, a terminal insulator for said cable, a pressure-responsive device attached to said insulator, and an insulating tube connecting said pressure-responsive device and the interior of said hollow wire.

4. In combination with an electrical cable, a tube lying along said cable in proximity with a conducting portion of said cable, a second tube lying along the cable embedded in an insulating portion thereof, a substance varying in pressure with variations in temperature and contained in said tubes, and pressure-responsive means connected with said tubes.

5. In an electrical cable comprising a conducting portion, an insulating portion surrounding said conducting portion, and a sheath of conducting material incasing said insulating portion, the combination of a tube embedded in and lying along said cable between said insulating portion and said sheath, a substance within said tube varying in pressure with variations in temperature, and a pressure-responsive device responsive to variations in pressure of said substance.

6. In combination with an insulated electrical cable, tubing embedded in a portion of said cable and lying along said cable, a substance varying in pressure with variations in temperature and contained in said tubing, a terminal insulator for said cable, a pressure-responsive device attached to said insulator, and a connection between said tubing and said pressure-responsive device.

In witness whereof, I have hereunto set my hand.

ERNST KIRCH.